Dec. 9, 1958          A. D. LYNN          2,863,778
FOOD CONTAINER AND VITAMIN PACKET COMBINATION
Filed Feb. 27, 1956
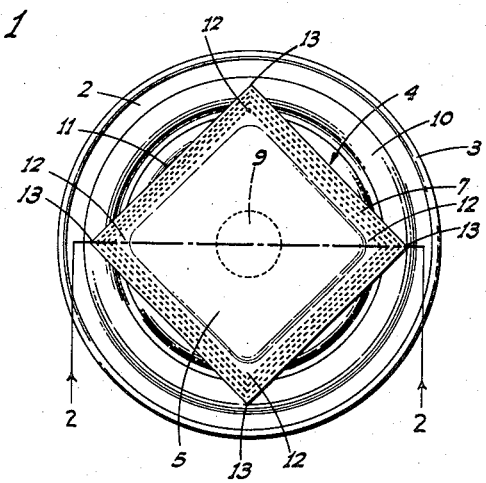
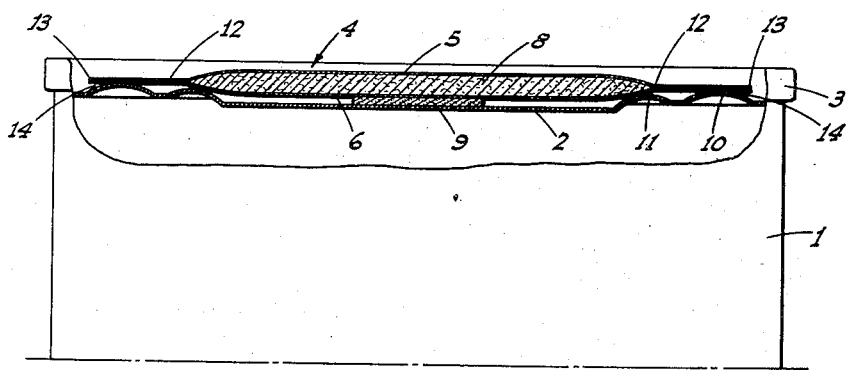
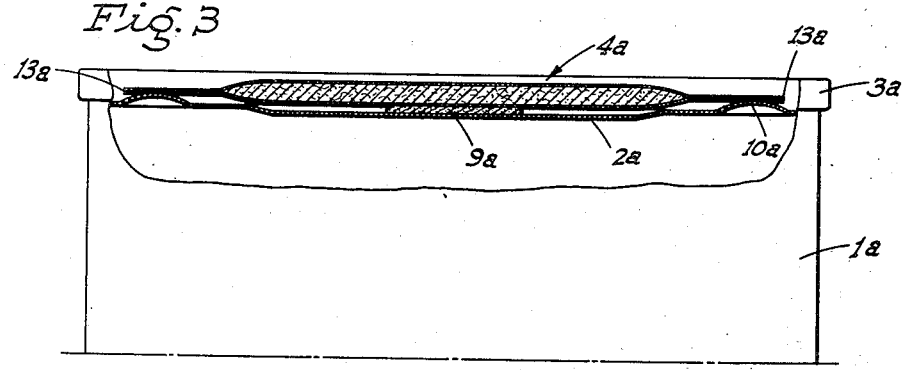
INVENTOR
Allan D. Lynn
BY
ATTYS

2,863,778

FOOD CONTAINER AND VITAMIN PACKET COMBINATION

Allan D. Lynn, Sacramento, Calif., assignor to Bonnie Dog Food Co., Sacramento, Calif., a corporation of California Application February 27, 1956, Serial No. 567,836

4 Claims. (Cl. 99—182)

This invention relates generally to new and useful improvements in a container combination for canned food products or the like, and particularly for those products to which it is desired to add supplementary material after removal from a primary container of such combination.

The invention is particularly designed—but not limited—for use to provide a novel medium whereby a vitamin supplement is made readily available for introduction into a canned food product when the can is opened and the contents removed for consumption.

Heretofore such supplementary material or additives have at times been introduced into the product before canning, and otherwise it was necessary to purchase a separate container of the additives—usually in a quantity larger than necessary—for introduction, after measuring, into the food product at the time of use.

In those instances where the supplementary material or additives have been incorporated in the food product at the time of manufacture, the results have been unsatisfactory, due to the fact that processing methods, temperatures, etc. have caused the supplementary material or additives to disintegrate or break down to an extent that their value was substantially lost. This is particularly true in the case of vitamin supplements where the high processing temperatures have caused the vitamins to lose their effective characteristics.

Further, in those instances where the supplementary material or additives have been purchased in a separate container there was inconvenience of storage and handling, the necessity of measurement, and waste.

It is therefore the major object of this invention to provide a novel food container and packet combination wherein the supplementary material or additives are separately carried in a sealed packet removably attached to the container, and in which packet the supplementary material or additives are present only in a quantity sufficient for the amount of food product in the container.

Another important object of the invention is to provide a food container and packet combination, as above, wherein the packet is attached to one end of the container in a novel manner and so that such packet can be readily manually removed without rupturing, and which would otherwise result in spillage of the contents.

An additional object of the invention is to provide a food container and packet combination, as in the preceding paragraph, wherein the packet is attached to the upper end or top of the container— i. e. the can—within the area known as the "countersink", and so that the protruding end flange of the can—and which is known as the "double seam width"—affords protection to the packet prior to the time that it is removed for use.

It is also an object of the invention to provide a food container and packet combination which is designed for ease and economy of manufacture.

Still another object of the invention is to provide a practical and reliable food container and packet combination, and one which will be exceedingly effective for the purpose for which it is designed.

These objects are accomplished by means of such structure and relative arrangement of parts as will fully appear by a perusal of the following specification and claims.

In the drawings:

Fig. 1 is a top plan view of a good product can and additive packet as arranged in the novel combination.

Fig. 2 is an enlarged transverse sectional elevation taken on line 2—2 of Fig. 1, and showing the packet as attached to a can end of the type which includes concentric upstanding annular ribs adjacent the rim flange.

Fig. 3 is a view similar to Fig. 2, but shows the packet as attached to a can end having a single upstanding annular rib adjacent the rim flange.

Referring now more particularly to the drawings, and to the characters of reference marked thereon, and at present to Figs. 1 and 2, the food container and vitamin packet combination includes a food product can 1 of the type which conventionally is formed with an upper end or top 2, and a rim flange 3 which upstands or projects upwardly a distance above said upper end or top 2. The area between said top 2 and the upper edge of the rim flange 3 is known as the "countersink" of the can.

Within the confines of such countersink there is disposed a relatively flat or thin packet, indicated generally at 4, which packet is dimensioned so that when centrally disposed within the countersink the outermost points or edges of the packet all terminate inwardly of the upstanding rim flange 3.

The packet 4, which is rectangular in plan in the present embodiment, comprises an upper sheet 5 and a lower sheet 6; said sheets being adhered together, as for example by crimping and sealing, indicated at 7, all about the edge portions. With the edge portions of the sheets 5 and 6 so adhered together, said sheets define— inwardly thereof—an enclosure or envelope in which a predetermined quantity of supplementary material or an additive 8—such as a vitamin compound—is contained. Such supplementary material or additive 8 is preferably in the form of a powder.

The sheets 5 and 6 of the packet 4 are made of any suitable material, such as metal foil or moisture proof paper, and which is capable of protecting the additive while it remains in the packet, but which may be readily manually torn to release such additive therefrom for use.

The packet 4, as disposed within the countersink of the can, is normally but detachably secured to the top 2 by a central spot 9 of adhesive, which adhesive is of a type which remains plastic or tacky; this characteristic of the adhesive being advantageous in that it permits the packet 4 to be manually removed from the can without likelihood of such packet being torn.

Adjacent but inwardly of the upstanding rim flange 3, the top 2 of the can is formed—in this embodiment— with a pair of concentric, upstanding, rounded ribs; the outer rib being shown at 10 and the inner rib at 11.

When the packet 4 is secured to the top 2, as above described, and symmetrically within the confines of the upstanding rim flange 3, the corner portions 12 of said packet rest on the rib 10. Additionally, the packet 4 is so dimensioned that the tips 13 of the corner portions 12 extend beyond the high point of said outer rib 10. This produces a slight gap 14 between each corner tip 13 and the adjacent outer face of the rib 10; this feature being of importance as it facilitates the manual grasping of the packet 4 for removal from the top 2.

More specifically, when it is desired to remove the packet 4, a fingernail of one hand is engaged under one of the corner tips 13, and thence drawn upwardly to permit it to be easily grasped between the thumb and index finger. As so grasped, the packet is pulled upwardly until it pulls free from the spot 9 of plastic or tacky adhesive.

Subsequently, and when the can 1 has been opened and the food product contents removed, the packet 4 is torn open and the additive mixed with such contents.

If the packet is made in a form other than rectangular, it will nevertheless be dimensioned to provide the feature of extending across—and overhanging beyond—the rib 10, for the same purpose as the overhang of the corner tips 13; i. e. for ease in initially picking up the packet from one point, and so that it can then be grasped and pulled off the top 2 of the can.

In the embodiment of Fig. 3 the arrangement is generally the same as hereinbefore described, except that here the packet 4a is associated with a can 1a whose top 2a includes only a single rib 10a. As before, the packet 4a lies within the countersink defined by the rim flange 3a, and said packet is centrally secured by a spot 9a of adhesive, which remains tacky.

Although the top 2a includes only the one rib 10a, the concept of the invention remains the same, and the packet 4a is dimensioned so that the corners extend across the rib 10a with the corner tips 13a overhanging the outer face of said rib for the same purpose as in the embodiments of Figs. 1 and 2.

In both embodiments the advantage of having the packet 4 or 4a relatively thin and disposed entirely within the countersink defined by the rim flange 3 or 3a resides in the fact that such packet is well protected, and is not readily subject to damage when the cans are stacked end to end in a shipping box or on a shelf.

It will be appreciated that the present invention is not limited to any particular kind of food product in the can, or additive in the packet.

From the foregoing description it will be readily seen that there has been produced such a food container and packet combination as will substantially fulfill the objects of the invention, as set forth herein.

While this specification sets forth in detail the present and preferred construction of the food container and packet combination, still in practice such deviations therefrom may be resorted to as do not form a departure from the spirit of the invention, as defined by the appended claims.

Having thus described the invention the following is claimed as new and useful, and upon which Letters Patent are desired, I claim:

1. In the combination of a container having a product therein, and a separate packet having an additive therein for such product; the container including an end, a rim flange projecting outwardly from said end to form a countersink, the packet being relatively flat and disposed entirely in said countersink in face to face relation to said end, there being a rib extending outwardly from said end laterally of the center thereof but spaced from the rim flange, at least one free edge portion of the packet extending over the high point of the rib and having a part projecting therebeyond in the direction but terminating short of said rim flange, said projecting part overhanging said end between the rib and the rim flange for finger access, and means detachably securing the packet to said end clear of said free edge portion.

2. A combination, as in claim 1, in which the rib is annular, the packet being symmetrically disposed relative to the rib, and said means securing the packet to said end radially inwardly of the rib.

3. A combination, as in claim 1, in which the packet is formed so that the projecting part of said free edge portion is a thin tip for such finger access.

4. In the combination of a container having a product therein, and a separate packet having an additive therein for such product; the container including an end, a rim flange projecting outwardly from said end to form a countersink, the packet being square, relatively flat, and disposed entirely in said countersink in face to face relation to said end, there being an annular rib extending outwardly from said end and spaced from the rim flange, the packet being symmetrically disposed relative to the rib and dimensioned so that corner portions of said packet extend over the high point of the rib with the corner tips projecting therebeyond in the direction but terminating short of said rim flange, said corner tips overhanging said end between the rib and the rim flange for finger access, and means detachably securing the packet to said end radially inwardly of said rib.

References Cited in the file of this patent

UNITED STATES PATENTS

| | | |
|---|---|---|
| 1,798,339 | Soulis | Mar. 31, 1931 |
| 2,707,588 | Amberg | May 3, 1955 |
| 2,758,932 | Scott | Aug. 14, 1956 |

OTHER REFERENCES

"Modern Packaging," August 1954, page 79.